(12) United States Patent
Kita et al.

(10) Patent No.: US 7,708,809 B2
(45) Date of Patent: May 4, 2010

(54) HYDROGEN PERMEABLE MEMBRANE

(75) Inventors: Koichi Kita, Saitama (JP); Shigeki Hara, Tsukuba (JP); Naotsugu Itoh, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 869 days.

(21) Appl. No.: 10/535,547

(22) PCT Filed: Nov. 20, 2003

(86) PCT No.: PCT/JP03/14829

§ 371 (c)(1),
(2), (4) Date: Feb. 16, 2006

(87) PCT Pub. No.: WO2004/045751

PCT Pub. Date: Jun. 3, 2004

(65) Prior Publication Data

US 2006/0213368 A1    Sep. 28, 2006

(30) Foreign Application Priority Data

| Nov. 20, 2002 | (JP) | 2002-336216 |
| Nov. 20, 2002 | (JP) | 2002-336217 |
| Nov. 20, 2002 | (JP) | 2002-336218 |
| Nov. 20, 2002 | (JP) | 2002-336219 |
| Nov. 20, 2002 | (JP) | 2002-336220 |
| Nov. 20, 2002 | (JP) | 2002-336221 |

(51) Int. Cl.
*B01D 53/12* (2006.01)

(52) U.S. Cl. .................. 96/4; 95/55; 95/56; 55/524

(58) Field of Classification Search .................. 95/56, 95/55; 96/4; 55/524
See application file for complete search history.

(56) References Cited

U.S. PATENT DOCUMENTS

| 3,241,293 A | 3/1966 | Pfefferle |
| 3,344,582 A | 10/1967 | Merrill et al. |
| 3,957,534 A | 5/1976 | Linkohr et al. |

(Continued)

FOREIGN PATENT DOCUMENTS

DE    100 11 104 A1    3/2001

(Continued)

OTHER PUBLICATIONS

International Search Report for PCT/JP03/14829 mailed Mar. 9, 2004.

*Primary Examiner*—Jason M Greene
*Assistant Examiner*—Dung Bui
(74) *Attorney, Agent, or Firm*—Darby & Darby P.C.

(57) ABSTRACT

A hydrogen permeable membrane which has an excellent high-temperature amorphous stability and a long lifetime under high-temperature heating operation and which can be miniaturized for use in a high-performance hydrogen purifier. The hydrogen permeable membrane is made of a non-crystalline nickel-zirconium alloy or zirconium-nickel alloy composed of 44 to 75 atom % of nickel or zirconium; and 0.2 to 16 atom % of aluminum, 0.2 to 12 atom % of vanadium and/or niobium, or 0.2 to 12 atom % of niobium and 0.1 to 10 atom % of phosphorus (provided that the combined amount of niobium and phosphorus is not more than 18 atom %); with the balance being zirconium or nickel and unavoidable impurities.

11 Claims, 1 Drawing Sheet

U.S. PATENT DOCUMENTS

| | | |
|---|---|---|
| 4,634,454 A | 1/1987 | Khan et al. |
| 4,781,734 A | 11/1988 | Behr et al. |
| 4,810,485 A | 3/1989 | Marianowski et al. |
| 4,944,777 A | 7/1990 | Shmayda et al. |
| 5,139,541 A | 8/1992 | Edlund |
| 5,217,506 A | 6/1993 | Edlund et al. |
| 5,259,870 A | 11/1993 | Edlund |
| 5,393,325 A | 2/1995 | Edlund |
| 5,895,519 A * | 4/1999 | Lorimer .................... 95/56 |
| 6,478,853 B1 | 11/2002 | Hara et al. |
| 2002/0159354 A1* | 10/2002 | Nakabayashi ............ 369/53.18 |
| 2003/0159354 A1* | 8/2003 | Edlund et al. .............. 48/127.9 |
| 2003/0183080 A1* | 10/2003 | Mundschau .................... 95/55 |
| 2003/0205138 A1* | 11/2003 | Edlund et al. ..................... 96/4 |
| 2004/0101740 A1* | 5/2004 | Sanders ..................... 429/40 |
| 2004/0229090 A1* | 11/2004 | Davis et al. ................... 429/17 |

FOREIGN PATENT DOCUMENTS

| | | |
|---|---|---|
| EP | 0 015 428 A1 | 9/1980 |
| FR | 2 790 751 A1 | 3/2000 |
| JP | 59-205434 | 11/1984 |
| JP | 62-143801 A | 6/1987 |
| JP | 63-4829 A | 1/1988 |
| JP | 1-262924 A | 10/1989 |
| JP | 2-268818 A | 11/1990 |
| JP | 7-775 A | 1/1995 |
| JP | 2000-159503 | 6/2000 |
| JP | 2000-256002 A | 9/2000 |
| JP | 2004-42017 A | 2/2004 |
| SU | 698914 | 11/1979 |

* cited by examiner

HYDROGEN PERMEABLE MEMBRANE

CROSS-REFERENCE TO PRIOR APPLICATION

This is a U.S. National Phase application under 35 U.S.C. §371 of International Patent Application No. PCT/JP2003/014829, filed Nov. 20, 2003, and claims the benefit of Japanese Patent Application Nos. 2002-336216, filed Nov. 20, 2002; 2002-336217, filed Nov. 20, 2002; 2002-336218, filed Nov. 20, 2002; 2002-336219, filed Nov. 20, 2002; 2002-336220, filed Nov. 20, 2002 and 2002-336221, filed Nov. 20, 2002, all of which are incorporated by reference herein. The International Application was published in Japanese on Jun. 3, 2004 as WO 2004/045751 A1 under PCT Article 21(2).

BACKGROUND OF THE INVENTION

1. Field of the Invention

The present invention relates to a hydrogen permeable membrane which has an excellent high-temperature amorphous stability, i.e., the quality of stably maintaining non-crystallinity for a long period of time when held in a high-temperature state, and which when used as a hydrogen permeable membrane in an apparatus such as a high-performance hydrogen purifier thus makes it possible to carry out a high-temperature heating operation that enhances the productivity of such a high-performance hydrogen purifier.

2. Description of the Related Art

"Green energy" has attracted much attention in recent years as a way to counteract such phenomena as atmospheric pollution and global warming. In particular, energy systems which use hydrogen gas (one type of green energy) as the fuel, such as hydrogen fuel cells and hydrogen gas turbines, are currently under active investigation.

The high-purity hydrogen gas used as the fuel gas in these energy systems is produced from a hydrogen-containing feed gas such as a mixed gas obtained by electrolyzing water or a mixed gas obtained by steam reforming liquefied natural gas (LNG). Such production is typically carried out using a high-performance hydrogen purifier like that shown schematically in FIG. 1 which is divided into a left-hand chamber and a right-hand chamber by a hydrogen permeable membrane that is made of a material permeable only to hydrogen and is reinforced at the periphery with a frame made of nickel or the like. A hydrogen-containing feed gas inlet and a bleed gas outlet are attached to the left-hand chamber, a high-purity hydrogen gas outlet is attached to the right-hand chamber, and a reaction chamber made of a material such as stainless steel is provided at the center. The feed gas is passed through the hydrogen permeable membrane with the reaction chamber heated to 200 to 300° C., thereby producing high-purity hydrogen gas by separative purification.

Hydrogen permeable membranes of this type which are made of non-crystalline nickel-zirconium or zirconium-nickel alloys are known. Processes for fabricating such membranes are known to include a liquid quenching process in which an alloy melt of a given composition is sprayed onto the surface of, for example, a rapidly rotating copper roll to effect solidification to a film thickness of 5 to 500 μm (e.g., see JP-A 2000-256002).

To enhance productivity, there is a trend among such high-performance hydrogen purifiers toward operation under high-temperature heating. In prior-art high-performance hydrogen purifiers which use hydrogen permeable membranes made of non-crystalline nickel-zirconium alloys, during operation at a high heating temperature above 300° C., the hydrogen permeable membrane which exhibits a high hydrogen-separating and permeating ability owing to its non-crystallinity is readily subject to localized crystallization. In the areas that have crystallized, the hydrogen permeating and purifying ability of the membrane markedly declines, as a result of which the passage through the membrane and admixture of impurity gases other than hydrogen cannot be avoided. Accordingly, such hydrogen permeable membranes have a relatively short service life.

There also exists a strong need for an even higher performance and a smaller size than has hitherto been achieved in high-performance hydrogen purifiers. This need has created in turn a strong desire for hydrogen permeable membranes endowed with a greater hydrogen-separating and permeating ability.

SUMMARY OF THE INVENTION

In light of the above, we have conducted investigations focused particularly on the above-described prior-art hydrogen permeable membranes made of non-crystalline nickel-zirconium and zirconium-nickel alloys which would enable operation of the above-described high-performance hydrogen purifiers under high-temperature heating.

The present invention provides a hydrogen permeable membrane made of a non-crystalline nickel-zirconium alloy composed of 44 to 75 atom % of nickel and 0.2 to 16 atom % of aluminum, with the balance being zirconium and unavoidable impurities; or made of a non-crystalline zirconium-nickel alloy composed of 44 to 75 atom % of zirconium and 0.2 to 16 atom % of aluminum, with the balance being nickel and unavoidable impurities. If the alloy used is a non-crystalline zirconium-nickel alloy, the nickel content is preferably not more than 43 atom %.

The aluminum included as an alloying element markedly improves the high-temperature amorphous stability of this hydrogen permeable membrane. Even in a high-temperature state above 300° C., crystallization is substantially suppressed, enabling the non-crystalline structure to be maintained over a long period of time. The use of such a membrane in a high-performance hydrogen purifier, for example, enables this high-temperature heating operation to be carried out, as a result of which productivity can be further enhanced.

The invention also provides a hydrogen permeable membrane made of a non-crystalline nickel-zirconium alloy composed of 44 to 75 atom % of nickel and 0.2 to 12 atom % of vanadium and/or niobium, with the balance being zirconium and unavoidable impurities; or made of a non-crystalline zirconium-nickel alloy composed of 44 to 75 atom % of zirconium and 0.2 to 12 atom % of vanadium and/or niobium, with the balance being nickel and unavoidable impurities. If the alloy used is a non-crystalline zirconium-nickel alloy, the nickel content is preferably not more than 43 atom %.

The vanadium and/or niobium included as an alloying element markedly improves the hydrogen-separating and permeating ability of this hydrogen permeable membrane. Accordingly, employing this membrane in a high-performance hydrogen purifier contributes to higher performance and downsizing of the purifier.

The invention additionally provides a hydrogen permeable membrane made of a non-crystalline nickel-zirconium alloy composed of 44 to 75 atom % of nickel, 0.2 to 12 atom % of niobium, and 0.1 to 10 atom % of phosphorus, provided the combined amount of niobium and phosphorus is not more than 18 atom %, with the balance being zirconium and unavoidable impurities; or made of a non-crystalline zirconium-nickel alloy composed of 44 to 75 atom % of zirconium, 0.2 to 12 atom % of niobium, and 0.1 to 10 atom % of phosphorus, provided the combined amount of niobium and phosphorus is not more than 18 atom %, with the balance being nickel and unavoidable impurities. If the alloy used is a non-crystalline zirconium-nickel alloy, the nickel content is preferably not more than 43 atom %.

The niobium included as an alloying element greatly enhances the hydrogen-separating and permeating ability of this hydrogen permeable membrane, thus contributing to higher performance and downsizing of high-performance hydrogen purifiers, for example. The phosphorus included as an alloying element markedly enhances the high-temperature amorphous stability. Even in a high-temperature state above 300° C., crystallization is greatly suppressed, enabling the non-crystalline structure to be maintained over a long period of time. The use of such a membrane makes it possible to carry out a high-temperature heating operation in the above-described high-performance hydrogen purifier, for example, enabling productivity to be further enhanced.

Next, the composition of the non-crystalline nickel-zirconium alloy and the non-crystalline zirconium-nickel alloy in the inventive hydrogen-separation permeation membranes is described.

(A) Non-Crystalline Nickel-Zirconium Alloy:

(a-1) Nickel:

The nickel constituent within the non-crystalline nickel-zirconium alloy, when present together with the zirconium constituent, forms by means of quenching solidification a non-crystalline structure that exhibits a hydrogen-separating and permeating ability and also serves to enhance the strength of the membrane. At a nickel content of less than 44%, the high strength desired of the membrane cannot be ensured. On the other hand, at a content of more than 75%, the relative proportion of zirconium within the alloy becomes small, which tends to result in a decline in the hydrogen-separating and permeating ability. Accordingly, the nickel content has been set at 44 to 75%. A nickel content of 50 to 69% is preferred.

(b-1) Aluminum:

As noted above, the aluminum constituent acts to enhance the high-temperature amorphous stability, and stably maintains the non-crystalline structure even at elevated temperatures above 300° C. However, at an aluminum content below 0.2%, a sufficient amorphous stability enhancing effect is not achieved. On the other hand, at a content greater than 16%, the hydrogen-separating and permeating ability of the membrane tends to decrease. Hence, the aluminum content has been set at 0.2 to 16%, and preferably 1 to 13%.

(c-1) Vanadium and Niobium:

These constituents form a non-crystalline structure together with the nickel and zirconium constituents. As noted above, vanadium and niobium serve to further enhance the hydrogen-separating and permeating ability. However, at a vanadium and niobium content of less than 0.2%, sufficient enhancement of this ability cannot be achieved. On the other hand, at a vanadium and niobium content of more than 12%, stable formation of a non-crystalline structure is difficult. Accordingly, the vanadium and niobium content has been set at 0.2 to 12%, and preferably 0.5 to 10%.

(d-1) Phosphorus:

As noted above, the phosphorus constituent improves the high-temperature amorphous stability and serves to stably ensure a non-crystalline structure even at elevated temperatures above 300° C. At a phosphorus content below 0.1%, sufficient enhancement of the amorphous stability is not achieved, whereas at a content above 10%, the hydrogen-separating and permeating ability of the membrane shows a tendency to decrease. Accordingly, the phosphorus content was set at 0.1 to 10%, and preferably 0.2 to 8%.

At a combined niobium and phosphorus content of more than 18%, the relative content of nickel and zirconium becomes too small, making it difficult to stably form a non-crystalline structure. For this reason, the combined amount of niobium and phosphorus has been set at not more than 18%.

(B) Non-Crystalline Zirconium-Nickel Alloy:

(a-2) Zirconium:

The zirconium constituent within the non-crystalline zirconium-nickel alloy, when present together with the nickel constituent, forms by means of quenching solidification a non-crystalline structure that exhibits a hydrogen-separating and permeating ability, and moreover enhances the hydrogen-separating and permeating ability of the membrane. At a zirconium content of less than 44%, the excellent hydrogen-separating and permeating ability desired of the membrane cannot be ensured. On the other hand, at a content of more than 75%, the relative proportion of nickel within the alloy becomes too small, which results in an abrupt drop in the membrane strength. Accordingly, the zirconium content has been set at 44 to 75%. A zirconium content of 50 to 70% is preferred.

If the nickel content in the non-crystalline zirconium-nickel alloy exceeds 43%, the membrane strength increases, but the relative proportion of zirconium becomes low, which tends to lower the hydrogen-separating and permeating ability of the membrane and thus makes it difficult to ensure a high hydrogen-separating and permeating ability. Hence, the upper limit in the nickel content was set at 43%.

(b-2) Aluminum:

As noted above, the aluminum constituent acts to enhance the high-temperature amorphous stability, and stably maintains the non-crystalline structure even at elevated temperatures above 300° C. However, at an aluminum content below 0.2%, a sufficient amorphous stability enhancing effect is not achieved. On the other hand, at a content greater than 16%, the hydrogen-separating and permeating ability of the membrane tends to decrease. Hence, the aluminum content has been set at 0.2 to 16%, and preferably 1 to 13%.

(c-2) Vanadium and Niobium:

These constituents form a non-crystalline structure together with the nickel and zirconium constituents. As noted above, vanadium and niobium serve to further enhance the hydrogen-separating and permeating ability. However, at a vanadium and niobium content of less than 0.2%, sufficient enhancement of this ability cannot be achieved. On the other hand, at a vanadium and niobium content of more than 20%, stable formation of a non-crystalline structure is difficult. Accordingly, the vanadium and niobium content has been set at 0.2 to 20%, and preferably 0.5 to 15%.

(d-2) Phosphorus:

As noted above, the phosphorus constituent improves the high-temperature amorphous stability and serves to stably ensure a non-crystalline structure even at elevated temperatures above 300° C. At a phosphorus content below 0.1%, sufficient enhancement of the amorphous stability is not achieved, whereas at a content above 15%, the hydrogen-separating and permeating ability of the membrane tends to decrease. Accordingly, the phosphorus content was set at 0.1 to 15%, and preferably 0.2 to 10%.

At a combined niobium and phosphorus content of more than 18%, the relative content of nickel and zirconium becomes too small, making it difficult to stably form a non-crystalline structure. For this reason, the combined amount of niobium and phosphorus has been set at not more than 18%.

DETAILED DESCRIPTION OF THE PREFERRED EMBODIMENTS

Figure 1:
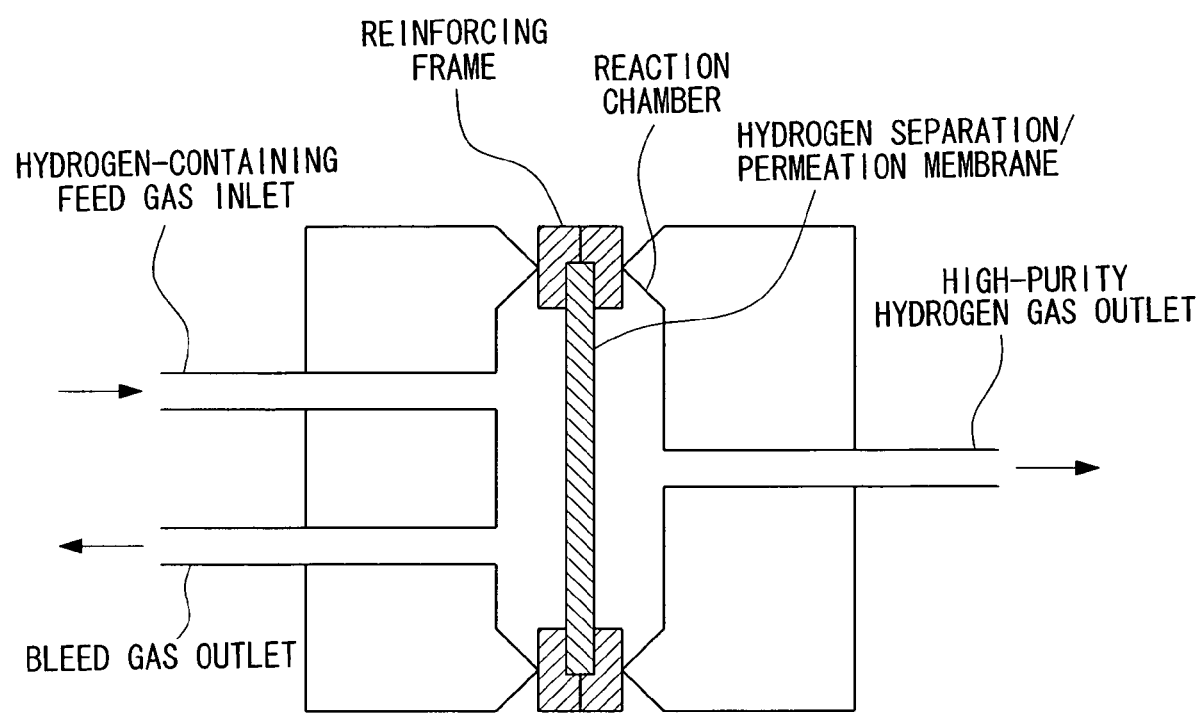
FIG. 1 is a schematic view of a high-performance hydrogen purifier.

The hydrogen permeable membrane of the invention is illustrated more fully in the following examples.

Inventive Hydrogen Permeable Membranes 1 to 29, and Prior-Art Hydrogen Permeable Membranes 1 to 12

Sponge zirconium of 99.5% purity, nickel of 99.9% purity and aluminum of 99.9% purity were used as the starting materials. These starting materials were blended in specific proportions and argon arc melted in a high-purity argon atmosphere to form 300 g ingots. The ingots were re-melted in a melting furnace within an argon atmosphere, and the melt was sprayed at a pressure of 0.05 MPa onto the surface of a water-cooled copper roll rotating at a speed of 33 m/s (nickel-zirconium alloys) or 20 m/s (zirconium-nickel alloys), thereby forming nickel-zirconium (or zirconium-nickel) alloy foils of the compositions shown in Table 1 (nickel-zirconium alloys) or Table 2 (zirconium-nickel alloys) which had a width of 30 mm and a thickness of 30 μm (nickel-zirconium alloys) or a width of 30 mm and a thickness of 50 μm (zirconium-nickel alloys). Each of these foils was cut to planar dimensions of 30×100 mm, thereby preparing inventive hydrogen permeable membranes 1 to 13 (nickel-zirconium alloys; Table 1) and 14 to 29 (zirconium-nickel alloys; Table 2), and preparing also prior-art hydrogen permeable membranes 1 to 6 (nickel-zirconium alloys; Table 1) and 7 to 12 (zirconium-nickel alloys; Table 2) which did not contain aluminum as an alloying element.

The microstructures of these hydrogen permeable membranes were examined by x-ray diffraction analysis and found in each case to be non-crystalline.

A palladium thin film was then formed by vapor deposition to a thickness of 10 nm on both sides of each of the above hydrogen permeable membranes. The membrane was then placed between two nickel reinforcing frames, each having a lateral outside dimension of 35 mm, a vertical outside dimension of 105 mm, a frame width of 5 mm and a frame thickness of 0.2 mm, and the membrane was ultrasonically welded to the reinforcing frames and thereby fixed. The membrane was then installed in this reinforced state within the reaction chamber of a high-performance hydrogen purifier of the construction shown in FIG. 1, and the interior of the reaction chamber was heated to 300° C. or 350° C.

In the case of inventive hydrogen permeable membranes 1 to 13 and prior-art hydrogen permeable membranes 1 to 6, a hydrogen-containing feed gas obtained by steam reforming LNG and containing 66.5 vol % of $H_2$, 17 vol % of $CO_2$ and 0.5 vol % of CO was fed through an inlet into the left-hand reaction chamber while holding the internal pressure within this chamber at 0.3 MPa.

In the case of inventive hydrogen permeable membranes 14 to 29 and prior-art hydrogen permeable membranes 7 to 12, a hydrogen-containing feed gas obtained by steam reforming methanol and containing 70 vol % of $H_2$, 22 vol % of $CO_2$ and 0.5 vol % of CO was fed through an inlet into the left-hand reaction chamber while holding the internal pressure within this chamber at 0.3 MPa.

At the same time, hydrogen purifying treatment in which the separated and purified high-purity hydrogen gas was drawn off from the outlet while holding the internal pressure in the right-hand chamber to 0.1 MPa was carried out, and the flow rate of the separated and purified high-purity hydrogen gas was measured with a gas flow meter 30 minutes after the start of treatment at reaction chamber heating temperatures of 300° C. and 350° C. The separated and purified high-purity hydrogen gas was also analyzed with a gas chromatograph every 100 hours following the start of hydrogen purification treatment, and the treatment time until the $CO_2$ gas content within the separated and purified high-purity hydrogen gas rose to 100 ppm was measured. This treatment time was regarded as the life of the membrane. The results of these measurements are shown in Tables 1 and 2.

TABLE 1

| Type of membrane | | Composition (atom %) | | | Reaction temperature of 300° C. | | Reaction temperature of 350° C. | |
|---|---|---|---|---|---|---|---|---|
| | | Ni | Al | Zr + impurities | High-purity hydrogen gas flow rate (ml/min) | Life of membrane (hours) | High-purity hydrogen gas flow rate (ml/min) | Life of membrane (hours) |
| Hydrogen permeable membranes according to invention | 1 | 44.12 | 9.52 | balance | 34.8 | 2,200 | 46.2 | 900 |
| | 2 | 50.10 | 9.77 | balance | 33.5 | 2,400 | 45.0 | 1,000 |
| | 3 | 54.17 | 9.45 | balance | 32.1 | 2,600 | 43.0 | 1,200 |
| | 4 | 60.75 | 9.44 | balance | 30.8 | 2,500 | 41.4 | 1,100 |
| | 5 | 65.51 | 9.50 | balance | 30.0 | 2,500 | 40.5 | 1,100 |
| | 6 | 69.57 | 9.34 | balance | 28.9 | 2,400 | 39.3 | 1,000 |
| | 7 | 74.92 | 9.63 | balance | 27.6 | 2,300 | 38.2 | 900 |
| | 8 | 60.80 | 0.52 | balance | 34.3 | 2,300 | 45.1 | 900 |
| | 9 | 61.24 | 1.16 | balance | 33.6 | 2,500 | 44.6 | 1,100 |
| | 10 | 61.10 | 3.75 | balance | 32.1 | 2,600 | 43.0 | 1,200 |
| | 11 | 61.56 | 7.90 | balance | 30.5 | 2,500 | 41.2 | 1,100 |
| | 12 | 61.11 | 12.96 | balance | 28.9 | 2,400 | 39.2 | 1,000 |
| | 13 | 60.71 | 15.91 | balance | 27.5 | 2,200 | 38.0 | 800 |

TABLE 1-continued

|  |  | Composition (atom %) |  |  | Reaction temperature of 300° C. | | Reaction temperature of 350° C. | |
|---|---|---|---|---|---|---|---|---|
|  |  |  |  |  | High-purity hydrogen gas | Life of | High-purity hydrogen gas | Life of |
| Type of membrane |  | Ni | Al | Zr + impurities | flow rate (ml/min) | membrane (hours) | flow rate (ml/min) | membrane (hours) |
| Prior-art | 1 | 50.16 | — | balance | 35.2 | 1,900 | 46.3 | 600 |
| Hydrogen | 2 | 60.81 | — | balance | 33.2 | 2,100 | 44.3 | 700 |
| permeable | 3 | 69.73 | — | balance | 29.1 | 2,000 | 39.1 | 600 |
| membranes | 4 | 62.34 | Cu: 0.82 | balance | 33.4 | 2,100 | 44.6 | 700 |
|  | 5 | 60.50 | Cu: 5.63 | balance | 30.9 | 2,100 | 41.6 | 600 |
|  | 6 | 58.70 | Cu: 14.35 | balance | 27.8 | 1,900 | 38.1 | 600 |

TABLE 2

|  |  | Composition (atom %) | | | Reaction temperature of 300° C. | | Reaction temperature of 350° C. | |
|---|---|---|---|---|---|---|---|---|
|  |  |  |  |  | High-purity hydrogen gas | Life of | High-purity hydrogen gas | Life of |
| Type of membrane |  | Zr | Al | Ni + impurities | flow rate (ml/min) | membrane (hours) | flow rate (ml/min) | membrane (hours) |
| Hydrogen | 14 | 44.08 | 14.78 | balance (41.14) | 24.3 | 2,200 | 33.4 | 900 |
| permeable | 15 | 47.25 | 9.89 | balance (42.86) | 25.4 | 2,300 | 34.5 | 900 |
| membranes | 16 | 50.63 | 6.61 | balance (42.76) | 26.1 | 2,400 | 34.9 | 1,000 |
| according to | 17 | 54.57 | 6.75 | balance (38.68) | 26.8 | 2,500 | 35.8 | 1,100 |
| invention | 18 | 58.29 | 6.21 | balance (35.50) | 27.3 | 2,600 | 36.5 | 1,200 |
|  | 19 | 62.43 | 6.24 | balance (31.33) | 28.4 | 2,500 | 37.8 | 1,100 |
|  | 20 | 66.40 | 6.47 | balance (27.13) | 29.2 | 2,400 | 38.4 | 1,000 |
|  | 21 | 71.69 | 6.56 | balance (21.75) | 29.9 | 2,200 | 39.5 | 900 |
|  | 22 | 74.85 | 6.26 | balance (18.89) | 30.7 | 2,100 | 40.3 | 800 |
|  | 23 | 64.48 | 0.53 | balance (34.99) | 30.8 | 2,200 | 40.5 | 900 |
|  | 24 | 64.35 | 1.19 | balance (34.46) | 30.2 | 2,300 | 39.7 | 1,000 |
|  | 25 | 64.16 | 3.65 | balance (32.19) | 29.0 | 2,400 | 38.3 | 1,100 |
|  | 26 | 64.05 | 7.89 | balance (28.06) | 28.3 | 2,500 | 37.8 | 1,100 |
|  | 27 | 63.95 | 10.10 | balance (25.95) | 27.0 | 2,500 | 36.4 | 1,100 |
|  | 28 | 59.35 | 14.93 | balance (25.72) | 25.9 | 2,400 | 34.8 | 1,000 |
|  | 29 | 56.61 | 17.93 | balance (25.45) | 24.4 | 2,200 | 33.6 | 900 |
| Prior-art | 7 | 59.53 | — | balance (40.47) | 27.3 | 1,800 | 36.5 | 500 |
| hydrogen | 8 | 65.83 | — | balance (34.17) | 29.1 | 2,000 | 38.6 | 600 |
| permeable | 9 | 71.51 | — | balance (28.49) | 30.6 | 1,900 | 40.4 | 600 |
| membranes | 10 | 61.39 | Cu: 0.56 | balance (38.05) | 28.4 | 2,000 | 37.9 | 600 |
|  | 11 | 60.45 | Cu: 4.83 | balance (34.72) | 25.4 | 1,900 | 34.5 | 500 |
|  | 12 | 55.31 | Cu: 14.89 | balance (29.80) | 24.2 | 1,800 | 33.3 | 500 |

Inventive Hydrogen Permeable Membranes 30 to 79, and Prior-Art Hydrogen Permeable Membranes 13 to 24

Sponge zirconium of 99.5% purity, nickel shot of 99.9% purity, Ni-51% V master alloy, and Ni-60% Nb master alloy were used as the starting materials. These starting materials were blended in specific proportions and argon arc melted in a high-purity argon atmosphere to form 300 g ingots. The ingots were re-melted in a melting furnace within an argon atmosphere, and the melt was sprayed at a pressure of 0.03 MPa onto the surface of a water-cooled copper roll rotating at a speed of 25 m/s (nickel-zirconium alloys) or 18 m/s (zirconium-nickel alloys), thereby forming nickel-zirconium alloy foils of the compositions shown in Table 3 which had a width of 20 mm and a thickness of 30 µm and zirconium-nickel alloy foils of the composition shown in Table 4 which had a width of 20 mm and a thickness of 40 µm. Each of these foils was cut to dimensions of 20×80 mm, thereby preparing hydrogen permeable membranes 30 to 79 according to the invention and preparing also comparative hydrogen permeable membranes 13 to 24 which did not contain vanadium and niobium as alloying elements and corresponded to the foregoing prior-art hydrogen permeable membranes.

The microstructures of these hydrogen permeable membranes were examined by x-ray diffraction analysis and found in each case to be non-crystalline.

A palladium thin film was then formed by vapor deposition to a thickness of 10 nm on both sides of each of the above hydrogen permeable membranes. The membrane was then placed between two nickel reinforcing frames, each having a lateral outside dimension of 25 mm, a vertical outside dimension of 85 mm, a frame width of 5 mm and a frame thickness of 0.2 mm, and the membrane was ultrasonically welded to the reinforcing frames and thereby fixed. The membrane was then installed in this reinforced state within the reaction chamber of a high-performance hydrogen purifier of the construction shown in FIG. 1.

In the case of nickel-zirconium alloys, the interior of the reaction chamber was heated to 300° C., a hydrogen-containing feed gas obtained by steam reforming methanol and containing 70 vol % of $H_2$ and 22 vol % of $CO_2$, with the balance being high-temperature steam and other components, was fed through an inlet into the left-hand reaction chamber while holding the internal pressure within this chamber at 0.5 MPa.

In the case of zirconium-nickel alloys, the interior of the reaction chamber was heated to 300° C., a hydrogen-containing feed gas obtained by steam reforming town gas (e.g. coal gas) and containing 66.5 vol % of $H_2$ and 20 vol % of $CO_2$, with the balance being high-temperature steam and other components, was fed through an inlet into the left-hand reaction chamber while holding the internal pressure within this chamber at 0.5 MPa.

At the same time, hydrogen purifying treatment in which the separate and purified high-purity hydrogen gas is drawn off from the outlet while holding the internal pressure within the right-hand chamber to 0.1 MPa was carried out, and the flow rate of the separated and purified high-purity hydrogen gas was measured with a gas flow meter 30 minutes after the start of treatment. The measurement results are shown in Tables 3 and 4. The hydrogen separating and permeating abilities of the membranes were rated based on these results.

The content of $CO_2$ gas, which is an impurity, in the above-described separated and purified high-purity hydrogen gases was measured using a gas chromatograph. In each case, $CO_2$ was not detected.

TABLE 3

| Type of membrane | | Composition (atom %) | | | | High-purity hydrogen gas flow rate (ml/min) |
|---|---|---|---|---|---|---|
| | | Ni | V | Nb | Zr + impurities | |
| Hydrogen permeable membranes according to invention | 30 | 44.11 | 5.24 | — | balance (50.65) | 48.3 |
| | 31 | 50.64 | 5.33 | — | balance (44.03) | 47.5 |
| | 32 | 61.42 | 5.29 | — | balance (33.29) | 44.2 |
| | 33 | 68.83 | 5.30 | — | balance (25.87) | 42.6 |
| | 34 | 74.68 | 5.21 | — | balance (20.11) | 39.3 |
| | 35 | 44.25 | — | 1.55 | balance (54.20) | 48.1 |
| | 36 | 50.31 | — | 1.47 | balance (48.22) | 47.3 |
| | 37 | 61.33 | — | 1.49 | balance (37.18) | 44.2 |
| | 38 | 68.71 | — | 1.53 | balance (29.76) | 42.3 |
| | 39 | 74.93 | — | 1.54 | balance (23.53) | 39.0 |
| | 40 | 63.50 | 0.22 | — | balance (36.28) | 39.7 |
| | 41 | 63.06 | 0.58 | — | balance (36.36) | 42.8 |
| | 42 | 62.42 | 3.50 | — | balance (34.08) | 45.2 |
| | 43 | 62.14 | 9.87 | — | balance (27.99) | 48.1 |
| | 44 | 61.98 | 11.96 | — | balance (26.06) | 47.5 |
| | 45 | 63.39 | — | 0.26 | balance (36.35) | 40.0 |
| | 46 | 63.21 | — | 0.54 | balance (36.25) | 43.4 |
| | 47 | 62.86 | — | 5.62 | balance (31.52) | 45.5 |
| | 48 | 62.08 | — | 9.91 | balance (28.01) | 47.7 |
| | 49 | 61.84 | — | 11.88 | balance (26.28) | 47.3 |
| | 50 | 65.42 | 0.08 | 0.15 | balance (34.35) | 39.4 |
| | 51 | 64.15 | 0.26 | 0.31 | balance (35.28) | 43.1 |
| | 52 | 59.17 | 2.31 | 3.28 | balance (35.24) | 45.7 |
| | 53 | 54.61 | 3.15 | 6.79 | balance (35.45) | 48.4 |
| | 54 | 50.24 | 7.25 | 4.70 | balance (37.81) | 49.2 |
| Comparative hydrogen permeable membranes | 13 | 50.21 | — | — | balance (49.79) | 35.2 |
| | 14 | 61.07 | — | — | balance (38.93) | 33.2 |
| | 15 | 68.62 | — | — | balance (31.38) | 30.0 |
| | 16 | 63.54 | — | — | Cu: 0.55 | balance (35.91) | 33.5 |
| | 17 | 61.42 | — | — | Cu: 5.25 | balance (33.33) | 30.7 |
| | 18 | 53.52 | — | — | Cu: 11.85 | balance (34.63) | 29.0 |

TABLE 4

| Type of membrane | | Composition (atom %) | | | | High-purity hydrogen gas flow rate (ml/min) |
|---|---|---|---|---|---|---|
| | | Zr | V | Nb | Ni + impurities | |
| Hydrogen permeable membranes according to invention | 55 | 44.11 | 12.96 | — | balance (42.89) | 37.5 |
| | 56 | 50.06 | 9.83 | — | balance (40.11) | 39.7 |
| | 57 | 60.74 | 9.66 | — | balance (29.60) | 41.1 |
| | 58 | 69.65 | 9.73 | — | balance (20.62) | 43.3 |
| | 59 | 74.88 | 9.68 | — | balance (15.44) | 43.7 |
| | 60 | 44.07 | — | 13.31 | balance (42.62) | 37.1 |
| | 61 | 50.45 | — | 6.65 | balance (42.90) | 39.3 |
| | 62 | 61.07 | — | 6.55 | balance (32.38) | 40.4 |
| | 63 | 69.77 | — | 6.60 | balance (23.63) | 41.9 |
| | 64 | 74.51 | — | 6.62 | balance (18.87) | 42.2 |
| | 65 | 58.56 | 0.26 | — | balance (41.18) | 37.4 |
| | 66 | 58.60 | 0.58 | — | balance (40.82) | 38.7 |
| | 67 | 58.61 | 3.50 | — | balance (37.89) | 40.1 |
| | 68 | 58.64 | 14.86 | — | balance (26.50) | 43.4 |
| | 69 | 58.61 | 19.90 | — | balance (21.49) | 43.9 |
| | 70 | 60.27 | — | 0.23 | balance (39.50) | 37.6 |
| | 71 | 60.25 | — | 0.54 | balance (39.21) | 38.9 |
| | 72 | 60.24 | — | 2.91 | balance (36.85) | 40.2 |
| | 73 | 60.31 | — | 14.93 | balance (24.76) | 42.9 |
| | 74 | 60.28 | — | 19.87 | balance (19.85) | 43.3 |
| | 75 | 65.73 | 0.19 | 0.07 | balance (34.01) | 37.2 |
| | 76 | 63.35 | 0.40 | 0.19 | balance (36.06) | 39.1 |
| | 77 | 59.47 | 4.32 | 5.29 | balance (30.92) | 41.4 |
| | 78 | 56.59 | 6.19 | 8.73 | balance (28.49) | 42.2 |
| | 79 | 51.37 | 9.51 | 10.46 | balance (28.66) | 42.8 |
| Prior-art hydrogen permeable membranes | 19 | 60.05 | — | — | balance (39.95) | 29.2 |
| | 20 | 66.24 | — | — | balance (33.76) | 31.0 |
| | 21 | 72.37 | — | — | balance (27.63) | 32.4 |
| | 22 | 60.45 | — | — | Cu: 0.63 | balance (38.92) | 29.9 |
| | 23 | 61.31 | — | — | Cu: 5.54 | balance (33.15) | 27.0 |
| | 24 | 53.52 | — | — | Cu: 19.52 | balance (26.96) | 25.2 |

Inventive Hydrogen Permeable Membranes 80 to 107, and Prior-Art Hydrogen Permeable Membranes 25 to 36

Sponge zirconium of 99.5% purity, nickel shot of 99.9% purity, Ni-60% Nb master alloy, and Ni-25% P master alloy were used as the starting materials. These starting materials were blended specific proportions and argon arc melted in a high-purity argon atmosphere to form 300 g ingots. The ingots were re-melted in a melting furnace within an argon atmosphere, and the melt was sprayed at a pressure of 0.03 MPa onto the surface of a water-cooled copper roll rotating at a speed of 25 m/s (nickel-zirconium alloys) or 18 m/s (zirconium-nickel alloys), thereby forming nickel-zirconium alloy foils of the compositions shown in Table 5 which had a width of 20 mm and a thickness of 30 μm and zirconium-nickel alloy foils of the composition shown in Table 6 which had a width of 20 mm and a thickness of 40 μm. Each of these foils was cut to dimensions of 20×80 mm, thereby preparing hydrogen permeable membranes 80 to 107 according to the invention and preparing also prior-art hydrogen permeable membranes 25 to 36 which did not contain niobium and phosphorus as alloying elements and corresponded to the foregoing prior-art hydrogen permeable membranes.

The microstructures of these hydrogen permeable membranes were examined by x-ray diffraction analysis and found in each case to be non-crystalline.

A palladium thin film was then formed by vapor deposition to a thickness of 10 nm on both sides of each of the above hydrogen permeable membranes. The membrane was then placed between two nickel reinforcing frames, each having a lateral outside dimension of 25 mm, a vertical outside dimension of 85 mm, a frame width of 5 mm and a frame thickness of 0.2 mm, and the membrane was ultrasonically welded to the reinforcing frames and thereby fixed. The membrane was then installed in this reinforced state within the reaction chamber of a high-performance hydrogen purifier of the construction shown in FIG. 1, and the interior of the reaction chamber was heated to 300° C. or 350° C. in each case. A hydrogen-containing feed gas obtained by steam reforming methanol and containing 70 vol % of $H_2$ and 22 vol % of $CO_2$, with the balance being high-temperature steam and other components, was fed through an inlet into the left-hand reaction chamber while holding the internal pressure within this chamber at 0.4 MPa. At the same time, hydrogen purifying treatment in which the separated and purified high-purity hydrogen gas is drawn off from the outlet while holding the internal pressure within the right-hand chamber to 0.1 MPa was carried out, and the flow rate of the separated and purified high-purity hydrogen gas was measured with a gas flow meter 1 hour after the start of treatment. The hydrogen separating and permeating abilities of the membranes were rated based on these results. In addition, the content of $CO_2$ gas, which is an impurity, within the separated and purified high-purity hydrogen gas was analyzed with a gas chromatograph every 100 hours following the start of hydrogen purification treatment, and the treatment time until the $CO_2$ gas content within the separated and purified high-purity hydrogen gas rose to 100 ppm was measured. This treatment time was regarded as the life of the membrane. The results of these measurements are shown in Tables 5 and 6.

TABLE 5

| Type of membrane | | Composition (atom %) | | | | Reaction temperature of 300° C. | | Reaction temperature of 350° C. | |
|---|---|---|---|---|---|---|---|---|---|
| | | Ni | Nb | P | Zr + impurities | High-purity hydrogen gas flow rate (ml/min) | Life of membrane (hours) | High-purity hydrogen gas flow rate (ml/min) | Life of membrane (hours) |
| Hydrogen permeable membranes according to invention | 80 | 44.08 | 2.28 | 1.53 | balance | 35.8 | 2,900 | 48.1 | 1,300 |
| | 81 | 51.13 | 2.21 | 1.64 | balance | 34.4 | 3,100 | 46.3 | 1,400 |
| | 82 | 59.26 | 2.19 | 1.52 | balance | 32.9 | 3,200 | 44.3 | 1,500 |
| | 83 | 68.94 | 2.23 | 1.57 | balance | 30.7 | 3,100 | 41.8 | 1,400 |
| | 84 | 74.78 | 2.27 | 1.50 | balance | 29.3 | 2,900 | 39.0 | 1,300 |
| | 85 | 62.53 | 0.23 | 3.70 | balance | 30.6 | 3,100 | 42.1 | 1,400 |
| | 86 | 62.34 | 0.69 | 3.72 | balance | 32.0 | 3,100 | 43.4 | 1,400 |
| | 87 | 57.85 | 9.86 | 3.67 | balance | 34.7 | 3,000 | 46.4 | 1,400 |
| | 88 | 57.37 | 11.85 | 3.75 | balance | 36.1 | 2,900 | 48.0 | 1,300 |
| | 89 | 60.51 | 5.15 | 0.13 | balance | 34.1 | 2,900 | 46.4 | 1,200 |
| | 90 | 60.34 | 5.18 | 0.24 | balance | 33.1 | 3,100 | 45.0 | 1,400 |
| | 91 | 56.44 | 5.14 | 7.91 | balance | 30.5 | 3,100 | 41.6 | 1,400 |
| | 92 | 54.72 | 5.12 | 9.78 | balance | 29.6 | 3,000 | 40.4 | 1,100 |
| Prior-art hydrogen permeable membranes | 25 | 50.20 | — | — | balance | 27.3 | 1,900 | 35.3 | 600 |
| | 26 | 60.85 | — | — | balance | 25.6 | 2,100 | 34.2 | 700 |
| | 27 | 69.54 | — | — | balance | 22.8 | 2,000 | 30.7 | 600 |
| | 28 | 62.40 | — | Cu: 0.55 | balance | 26.1 | 2,100 | 33.8 | 700 |
| | 29 | 60.50 | — | Cu: 5.25 | balance | 23.8 | 2,100 | 31.7 | 600 |
| | 30 | 58.70 | — | Cu: 9.63 | balance | 21.6 | 1,900 | 29.6 | 600 |

TABLE 6

| Type of membrane | | Composition (atom %) | | | | Reaction temperature of 300° C. | | Reaction temperature of 350° C. | |
|---|---|---|---|---|---|---|---|---|---|
| | | Zr | Nb | P | Ni + impurities | High-purity hydrogen gas flow rate (ml/min) | Life of membrane (hours) | High-purity hydrogen gas flow rate (ml/min) | Life of membrane (hours) |
| Hydrogen permeable membranes according to invention | 93 | 44.13 | 6.59 | 6.37 | balance (42.91) | 30.1 | 2,900 | 40.1 | 1,300 |
| | 94 | 50.37 | 5.04 | 2.14 | balance (42.45) | 30.9 | 2,900 | 40.3 | 1,300 |
| | 95 | 60.22 | 3.69 | 2.12 | balance (33.97) | 32.6 | 3,000 | 42.4 | 1,400 |
| | 96 | 65.91 | 3.64 | 2.17 | balance (28.28) | 34.3 | 3,100 | 44.4 | 1,400 |
| | 97 | 74.65 | 3.67 | 2.20 | balance (19.48) | 35.0 | 2,900 | 45.5 | 1,300 |
| | 98 | 62.53 | 0.21 | 1.55 | balance (35.71) | 31.2 | 3,000 | 40.5 | 1,400 |
| | 99 | 62.34 | 1.08 | 1.57 | balance (35.01) | 31.9 | 3,000 | 41.4 | 1,400 |
| | 100 | 58.72 | 9.86 | 1.54 | balance (29.88) | 33.8 | 2,900 | 43.7 | 1,300 |
| | 101 | 55.26 | 14.31 | 1.52 | balance (28.91) | 34.6 | 2,800 | 44.6 | 1,300 |
| | 102 | 50.37 | 19.83 | 1.59 | balance (28.21) | 35.1 | 2,700 | 45.2 | 1,200 |
| | 103 | 61.29 | 7.31 | 0.13 | balance (31.27) | 34.9 | 2,900 | 44.9 | 1,200 |
| | 104 | 60.50 | 7.28 | 0.26 | balance (31.96) | 34.5 | 3,000 | 44.5 | 1,400 |
| | 105 | 56.01 | 7.28 | 4.79 | balance (31.92) | 33.7 | 3,100 | 43.8 | 1,400 |
| | 106 | 52.37 | 7.34 | 9.55 | balance (30.74) | 32.1 | 3,100 | 42.0 | 1,400 |
| | 107 | 47.25 | 7.30 | 14.89 | balance (30.56) | 30.4 | 3,000 | 40.0 | 1,300 |

TABLE 6-continued

| Type of membrane | | Composition (atom %) | | | Reaction temperature of 300° C. | | Reaction temperature of 350° C. | |
|---|---|---|---|---|---|---|---|---|
| | | Zr | Nb | P | Ni + impurities | High-purity hydrogen gas flow rate (ml/min) | Life of membrane (hours) | High-purity hydrogen gas flow rate (ml/min) | Life of membrane (hours) |
| Prior-art hydrogen permeable membranes | 31 | 58.67 | — | — | balance (41.33) | 24.1 | 1,800 | 32.3 | 500 |
| | 32 | 65.12 | — | — | balance (34.88) | 26.3 | 2,000 | 34.6 | 600 |
| | 33 | 70.38 | — | — | balance (29.62) | 27.0 | 1,900 | 35.8 | 600 |
| | 34 | 60.84 | — | Cu: 0.58 | balance (38.58) | 25.1 | 2,000 | 33.6 | 600 |
| | 35 | 59.28 | — | Cu: 5.17 | balance (35.55) | 22.5 | 1,900 | 31.0 | 500 |
| | 36 | 58.63 | — | Cu: 14.21 | balance (27.16) | 21.6 | 1,800 | 29.6 | 500 |

INDUSTRIAL APPLICABILITY

As is apparent from the above tables, a comparison of inventive hydrogen permeable membranes 1 to 29 with prior-art hydrogen permeable membranes 1 to 12 which do not contain aluminum as an alloying element shows that even when aluminum is present as an alloying element, there is substantially no change in the production and flow rate of separated and purified high-purity hydrogen gas (i.e., in the hydrogen separating and permeating action) at a normal heating and operating temperature of 300° C. and even at a high-temperature heating and operating temperature of 350° C. However, because inventive hydrogen permeable membranes 1 to 29 which contain aluminum as an alloying element all have excellent high-temperature amorphous stability, they clearly exhibit a much longer service life than prior-art hydrogen-separation permeation membranes 1 to 12, particularly in high-temperature heating operation.

As mentioned above, the hydrogen permeable membranes of the invention have excellent high-temperature amorphous stability, with crystallization being clearly suppressed even at elevated temperatures above 300° C. so that a non-crystalline microstructure is maintained. Accordingly, this enables the high-temperature heating operation of equipment such as high-performance hydrogen purifiers, contributing to a further improvement in productivity.

As is also apparent from the above tables, a comparison of inventive hydrogen permeable membranes 30 to 79 which contain vanadium and/or niobium as alloying elements with comparative hydrogen permeable membranes 13 to 24 which do not contain these elements clearly shows that, due to the effects of the vanadium and/or niobium present as alloying elements, the former membranes exhibit a much better hydrogen-separating and permeating ability than the latter membranes.

As noted above, because these hydrogen permeable membranes according to the invention exhibit a much better hydrogen-separating and permeating ability, they can contribute to a higher performance and downsizing in high-performance hydrogen purifiers.

As is additionally apparent from the above tables, owing to the effects of the niobium included as an alloying element, inventive hydrogen permeable membranes 80 to 107 all have an enhanced hydrogen-separating and permeating ability at an ordinary heating and operating temperature of 300° C. and also at an elevated heating and operating temperature of 350° C. That is, production/flow rate of the separated and purified high-purity hydrogen gas increases relative to prior-art hydrogen permeable membranes 25 to 36 which do not contain niobium. In addition, owing to the effects of the phosphorus in membranes 80 to 107 according to the invention, these inventive membranes also have an excellent high-temperature amorphous stability and thus clearly exhibit a much longer service life than prior-art hydrogen permeable membranes 25 to 36, particularly in high-temperature heating operation.

As noted above, in these inventive hydrogen permeable membranes, crystallization is markedly suppressed at elevated temperatures above 300° C. Hence, the membranes exhibit an excellent hydrogen-separating and permeating ability while at the same time having an excellent high-temperature amorphous stability that maintains a non-crystalline microstructure. This enables higher performance and downsizing to be achieved in high-performance hydrogen purifiers, in addition to which it allows high-temperature heating operation to be carried out, contributing to an even further improvement in productivity.

What is claimed is:

1. A hydrogen permeable foil, in an amorphous state, comprising:
    a non-crystalline zirconium-nickel alloy composed of
        44 to 75 atom % of zirconium; and
        0.2 to 12 atom % of at least one of vanadium and niobium;
    wherein the balance being nickel and unavoidable impurities.

2. The hydrogen permeable foil of claim 1 wherein, the nickel content is less than or equal to 43 atom %.

3. The hydrogen permeable foil of claim 1, further comprising palladium thin film on both sides of the foil.

4. The hydrogen permeable foil of claim 1, wherein the foil has a high-purity hydrogen gas flow rate of 40 ml/min or more.

5. A hydrogen permeable foil, in an amorphous state, comprising:
    a non-crystalline zirconium-nickel alloy composed of
        44 to 75 atom % of zirconium;
        0.2 to 12 atom % of niobium; and
        0.1 to 10 atom % of phosphorus, wherein the combined amount of niobium and phosphorus is less than or equal to 18 atom %,
    the amount of nickel being greater than the amount of niobium or phosphorus and the balance unavoidable impurities.

6. The hydrogen permeable foil of claim 5, wherein the nickel content is between 19 and 43 atom %.

7. The hydrogen permeable foil of claim 5, further comprising palladium thin film on both sides of the foil.

8. A hydrogen permeable foil, in an amorphous state, comprising a non-crystalline nickel-zirconium alloy composed of:
   44 to 75 atom % of nickel; and
   0.2 to 12 atom % of at least one of vanadium and niobium, wherein the balance being zirconium and unavoidable impurities.

9. The hydrogen permeable foil of claim 8, further comprising palladium thin film on both sides of the foil.

10. A hydrogen permeable foil, in an amorphous state, comprising a non-crystalline nickel-zirconium alloy composed of:
   44 to 75 atom % of nickel;
   0.2 to 12 atom % of niobium; and
   0.1 to 10 atom % of phosphorus; wherein the combined amount of niobium and phosphorus is not more than 18 atom %,
   wherein the balance being zirconium and unavoidable impurities.

11. The hydrogen permeable foil of claim 10, further comprising palladium thin film on both sides of the foil.

* * * * *